(12) United States Patent
Bisani et al.

(10) Patent No.: US 7,813,929 B2
(45) Date of Patent: Oct. 12, 2010

(54) AUTOMATIC EDITING USING PROBABILISTIC WORD SUBSTITUTION MODELS

(75) Inventors: Maximilian Bisani, Arlington, MA (US); Paul Vozila, Arlington, MA (US); Olivier Divay, Vieux-Vy sur Couesnon (FR)

(73) Assignee: Nuance Communications, Inc., Burlington, MA (US)

( * ) Notice: Subject to any disclaimer, the term of this patent is extended or adjusted under 35 U.S.C. 154(b) by 821 days.

(21) Appl. No.: 11/693,961

(22) Filed: Mar. 30, 2007

(65) Prior Publication Data

US 2008/0243500 A1    Oct. 2, 2008

(51) Int. Cl.
  *G10L 15/18*    (2006.01)
(52) U.S. Cl. .................................. 704/257; 704/235
(58) Field of Classification Search ................ 704/235, 704/251, 252, 254, 257
See application file for complete search history.

(56) References Cited

U.S. PATENT DOCUMENTS

| | | | | |
|---|---|---|---|---|
| 5,668,928 A | * | 9/1997 | Groner | 704/243 |
| 6,397,179 B2 | * | 5/2002 | Crespo et al. | 704/242 |
| 6,490,561 B1 | * | 12/2002 | Wilson et al. | 704/251 |
| 6,813,603 B1 | * | 11/2004 | Groner et al. | 704/235 |
| 6,834,264 B2 | * | 12/2004 | Lucas et al. | 704/235 |
| 7,447,635 B1 | * | 11/2008 | Konopka et al. | 704/275 |
| 7,464,031 B2 | * | 12/2008 | Axelrod et al. | 704/236 |
| 7,613,610 B1 | * | 11/2009 | Zimmerman et al. | 704/235 |

OTHER PUBLICATIONS

Och, Franz Joseph, et al, "Discriminative Training and Maximum Entropy Models for Statistical Machine Translation", *Proceedings of the 40$^{th}$ Annual Meeting of the Association for Computational Linguistics (ACL)*, Philadelphia, Jul. 2002, pp. 295-302.

* cited by examiner

*Primary Examiner*—Abul Azad
(74) *Attorney, Agent, or Firm*—Sunstein Kann Murphy & Timbers LLP

(57) ABSTRACT

An input sequence of unstructured speech recognition text is transformed into output structured document text. A probabilistic word substitution model is provided which establishes association probabilities indicative of target structured document text correlating with source unstructured speech recognition text. The input sequence of unstructured speech recognition text is looked up in the word substitution model to determine likelihoods of the represented structured document text corresponding to the text in the input sequence. Then, a most likely sequence of structured document text is generated as an output.

24 Claims, 1 Drawing Sheet

AUTOMATIC EDITING USING PROBABILISTIC WORD SUBSTITUTION MODELS

FIELD OF THE INVENTION

The present invention relates to post-processing of speech recognition text.

BACKGROUND ART

Automatic speech-to-text systems convert spoken dictation into text. In one typical application, an author (e.g. a doctor or a lawyer) dictates information into a telephone handset or a portable recording device. The speech-to-text system then processes the dictation audio automatically to create a draft text document. Optionally, a human transcriptionist would then verify the accuracy of the document and fix occasional errors. Typically, authors want to spend as little time as possible dictating. They usually focus only on the content and rely on the transcriptionist to compose a readable, syntactically correct, stylistically acceptable and formally compliant document. For this reason, there is a considerable discrepancy between what the speaker has literally said and the final document.

In particular, in the specific application of medical dictation, there are many kinds of differences between the literal dictated speech and the final document, including, for example:

Punctuation marks are typically not dictated.
No instructions on the formatting of the report are dictated.
Frequently section headings are only implied. ("vitals are" becomes "PHYSICAL EXAMINATION: VITAL SIGNS:")
In enumerated lists, typically speakers use phrases like "number one . . . next number . . . " which need to be turned into "1 . . . 2 . . . "
The dictation usually begins with a preamble (e.g. "This is doctor XYZ . . . ") which does not appear in the final report. Similarly, there are typically phrases at the end of the dictation which should not be transcribed (e.g. "End of dictation. Thank you.")
There are specific standards regarding the use of medical terminology—transcriptionists frequently expand dictated abbreviations (e.g. "CVA" becomes "cerebrovascular accident") or otherwise use equivalent but different terms (e.g. "nonicteric sclerae" becomes "no scleral icterus")
The dictation typically has a more narrative style (e.g. "She has no allergies.", "I examined him"). In contrast, the final report is normally more impersonal and structured (e.g. "ALLERGIES: None.", "he was examined").
For the sake of brevity, speakers frequently omit function words. ("patient" vs. "the patient", "denies fever pain" vs. "he denies any fever or pain")
Because the dictation is spontaneous, disfluencies are quite frequent, in particular false starts, corrections, and repetitions. (e.g. "22-year-old female, sorry, male 22-year-old male" vs. "22-year-old male")
Instructions to the transcriptionist and so-called normal reports such as pre-defined text templates which are invoked by short phrase like "This is a normal chest x-ray."
In addition to the above, speech recognition output contains certain recognition errors, some of which may occur systematically. Other application domains (e.g. law) may show different or additional discrepancies. (e.g. instructions to insert an address or a legal citation).

These phenomena pose a problem that goes beyond the actual literal speech recognition. The speech recognizer is meant to produce an accurate verbatim transcription of the recorded utterance. But, even with a perfectly accurate verbatim transcript of the user's utterances, the transcriptionist would still need to perform a significant amount of editing to obtain a document that conforms to the customary standards. Preferably, this manual editing should be reduced as far as possible. We refer to such efforts to transform the unstructured speech recognition text result into well-formed structured document text as transformation modeling. Transformation modeling also has the general capacity to correct some of the systematic speech recognition errors.

SUMMARY OF THE INVENTION

An input sequence of unstructured speech recognition text is transformed into output structured document text. A probabilistic word substitution model is provided which establishes association probabilities indicative of target structured document text correlating with source unstructured speech recognition text. The input sequence of unstructured speech recognition text is looked up in the word substitution model to determine likelihoods of the represented structured document text corresponding to the text in the input sequence. Then, a most likely sequence of structured document text is generated as an output.

The most likely sequence of structured document text may be derived using a dynamic programming beam search or a forward-backward search. And the word substitution model may calculate likelihoods by a log-linear combination of one or more feature functions using interpolation parameters. The feature functions may be defined in terms of associations between a source word and a sequence of target words. The probabilistic word substitution model may be derived based on a set of archived dictations and corresponding text documents.

In specific embodiments, the word substitution model may include speaker dependent models, speaker independent models, or a combination of speaker dependent models and speaker independent models. The structured document text may include medical report document text or legal document text.

DETAILED DESCRIPTION OF SPECIFIC EMBODIMENTS

Figure 1:
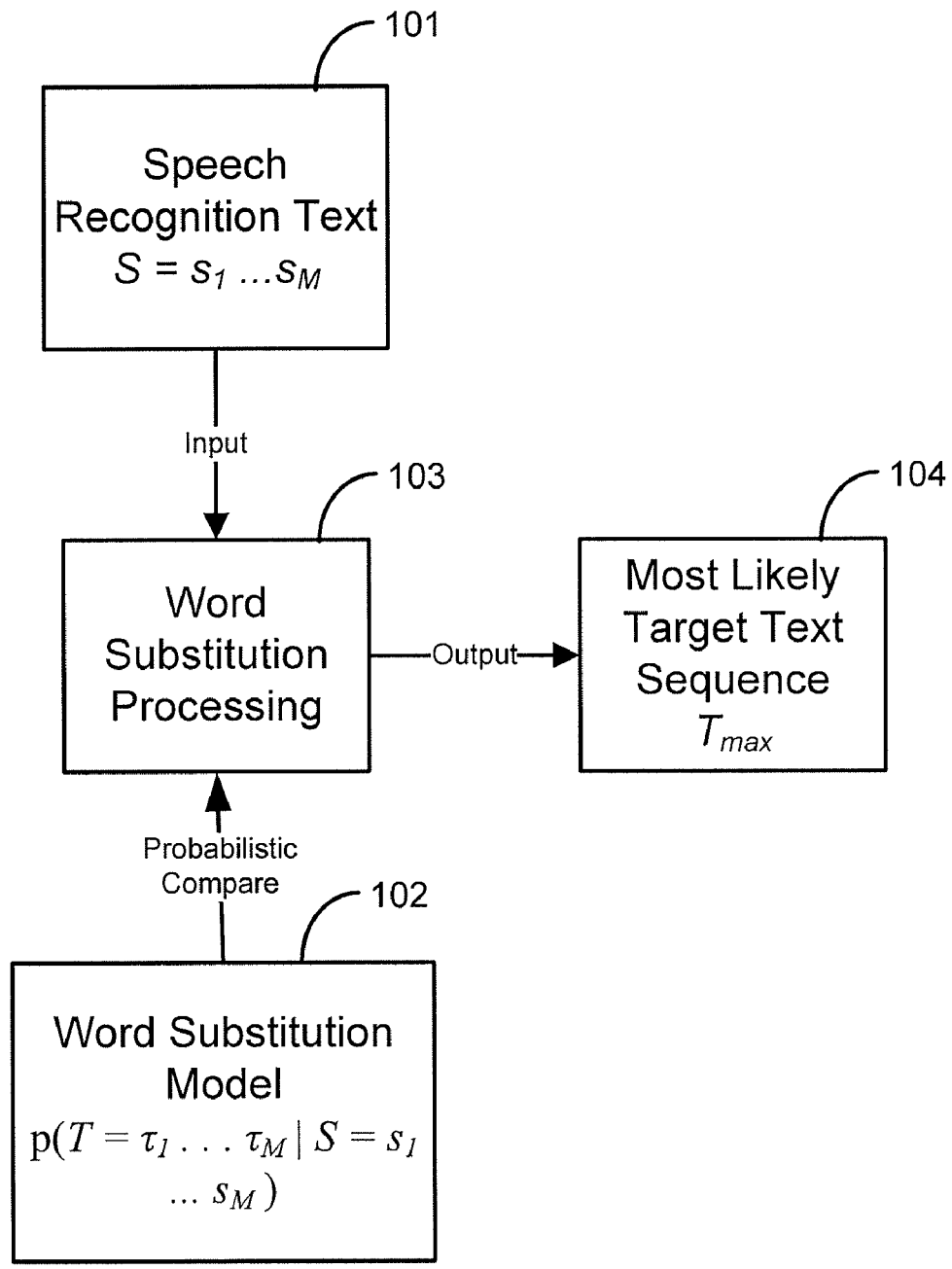
FIG. 1 shows the basic structure of an embodiment of the invention using PWS transformation models.

Embodiments of the present invention are directed to transformation modeling for transforming an input sequence of unstructured speech recognition text into corresponding output structured document text. This produces a well-formed final document, or at least a token sequence corresponding to the final document which is ready for formatting. In other words, applications produce a document corresponding to what is really wanted, rather than what was actually said. In the following discussion, a specific example of transformation modeling is given and referred to as "probabilistic word substitution" (PWS).

FIG. 1 shows the basic structure of an embodiment of the invention using a PWS transformation model. A word substitution processing module 103 uses a probabilistic word substitution (PWS) model 102, $p(T=\tau_1 \ldots \tau_M | S=s_1 \ldots s_M)$ which represents the likelihood of a target word sequence in the structured text of the final report document corresponding to a sequence of unstructured speech recognition text. An input sequence of unstructured speech recognition text, 101, $S=s_1 \ldots s_M$ is processed by querying the model for candidate substitutions for S and for the probability of each candidate. The output is a most likely target text sequence, $T_{max}$.

In specific embodiments, the transformation modeling has two phases. In the training phase, a set of archived dictations and corresponding text documents is used as training data to estimate feature parameters for the PWS transformation models. In the application phase, the model parameters are used to transform newly dictated documents.

The training phase starts from dictated audio files as processed by the speech recognizer into an approximate verbatim transcription text of the input dictated speech. Each example of unstructured speech recognition text result is referred to as the spoken or source word sequence, $S=s_1 \ldots s_M$. And the training data final structured report documents are cleaned (e.g., removing page headers and footers), tagged (e.g., identification of section headings), and tokenized. Each example of structured document text is referred to as the text or target word sequence, $T=t_1 \ldots t_N$. (Strictly speaking, this is a simplification for the purposes of discussion. Actually, the tokenization may be ambiguous where the target text T is actually represented as a directed acyclic graph encoding multiple possibilities rather than a sequence. But because this ambiguity is resolved in the next step, we can frame the discussion in terms of word sequence).

For each document, the source and target sequences are aligned in a 1-to-n scheme in which each source word is assigned to a sequence of zero, one, or more target words. Specifically, for each source word $s_z$, we refer to an assigned target word sequence $\tau_z$ in which a given specific substitution target $\tau_z$ may be an empty sequence. The target word sequence is segmented into M segments $T=\tau_1 \ldots \tau_M$. A source word and its replacement sequence are referred to as a "segment." The alignment of a structured document is a sequence of segments. In one specific embodiment, the alignment criterion is to maximize the likelihood of a context independent segment model, which may be performed by an expectation maximization algorithm. In the process of this alignment, any ambiguities of the tokenization step are resolved and a single target word sequence is chosen that is the best match to the source word sequence.

In one specific embodiment, the alignment uses two steps. First, an edit distance alignment of source sequence and target sequence is produced, resolving ambiguities on the target sequence. Out-of-order sections are also detected and addressed—when a piece of text appears in the training document in a different order than it was dictated, the target sequence is reordered to match the source sequence. Second, a segmentation of the target sequence is performed using an expectation maximization algorithm. This algorithm makes use of the alignment from the previous step to constrain the set of possible segmentations. In particular stretches of aligned unaltered words are taken as fixed (so-called observed) segments. The specific example of separation of the alignment into two steps provides some efficiency benefits, but it may not be needed in other embodiments.

For each source word, a count is determined for how often each particular target sequence is aligned to it in the training data. For example, the set of target sequences that occur two or more times as a replacement of a source word s, may be defined as the allowable replacements for s, and denoted as A(s). The threshold of two is a configuration parameter that may be varied. As a specific example, suppose that in one specific system the word "patient" was deleted 10 times, left unchanged 105 times, replaced by "the patient" 113 times, and once replaced by "she". The word "patient" will then have three allowable values: A(patient)={( ), (patient), (the, patient)}.

In addition, a set of transformation model feature functions is defined. Some feature functions may have free parameters determined using statistics derived from the set of aligned documents. There are many different possible feature functions which may be defined.

For example, a target word m-gram log-probability feature may be usefully defined. An m-gram language model for target documents is estimated using standard techniques (discounting, back-off, interpolation), and the logarithm of the probability estimate may be used as a feature function. Each value of m constitutes a separate feature function:

$$F(S, T) = \sum_{j=1}^{M} \log p(t_j \mid t_{j-m+1}, \ldots, t_{j-1})$$

Expressed as a local feature:

$$f(s_i, \tau_i, h_i) = \sum_{j:a(j)=i} \log p(t_j \mid t_{j-m+1}, \ldots, t_{j-1})$$

where a(j) is the source position aligned to the target position j.

Another example of a usefully defined feature function is a segment (joint) m-gram log-probability. Segments are considered as atomic units and an m-gram model is estimated using standard language modeling techniques (discounting, back-off, interpolation). The logarithm of the probability estimate may then be used as a feature function where each value of m constitutes a separate feature function:

$$f(s_i, \tau_i, h_i) = \log p(s_i, \tau_i \mid s_{i-m+1}, \tau_{i-m+1}, \ldots, s_{i-1}, \tau_{i-1})$$

For example, one specific embodiment uses a joint segment tri-gram as the only function.

Other examples of useful feature functions that may be defined include:

A section name m-gram log-probability, like a target word m-gram log-probability but only section headings are considered.

Section specific target word m-gram log-probabilities like target word m-gram log-probabilities, but where the most recent section name is used as an additional conditioning variable.

Section specific target word m-gram log-probabilities like segment m-gram log-probabilities, but where the most recent section name is used as an additional conditioning variable.

Section length distribution function where a model predicting the number of words in a section given the section name is estimated. The feature function is the sum over all sections in the document of the logarithm of the probabilities given by this model.

Number of deleted source words where different feature functions can be defined by distinguishing word categories (e.g., function words, content words, names, numbers).

Number of inserted words where different feature functions can be defined by distinguishing word categories (e.g., function words, content words, names, numbers).

Number of source words left unchanged where different feature functions can be defined by distinguishing word categories (e.g. function words, content words, names, numbers).

Number of punctuation marks inserted where different feature functions can be defined by distinguishing different types of punctuation marks (period, comma).

Number of section heading inserted.

Number of inconsistent enumeration tags.

Having defined a set of feature functions for the PWS transformation models, the index k=1 . . . K is used to distinguish between different feature functions. Feature functions are real-valued and are defined over pairs of source and target texts $F_k(S, T)$. For efficiency reasons and without loss in generality, local feature functions may be used and defined over (aligned) document prefixes $f_k(s_1, \tau_1, \ldots, s_i, \tau_i)$. The history (or left context) of position i is indicated as $h_i = (s_1, t_1, \ldots s_{i-1}, t_{i-1})$, local feature functions are denoted as $f_k(s_i, \tau_i, h_i)$. Assuming a given alignment, the relation between a global and an equivalent local feature function is:

$$F_k(S, T) = \sum_{i=1}^{M} f_k(s_i, \tau_i, h_i)$$

Embodiments using PWS transformation models represent the probability of the target text by a log-linear combination of feature functions:

$$p(T \mid S) = 1/Z(S)\exp\left(\sum_{k=1}^{K} \lambda_k F_k(S, T)\right)$$

where $\lambda_1, \ldots, \lambda_K$ are interpolation parameters, and Z(S) is a normalization term:

$$Z(S) = \sum_{T} \exp\left(\sum_{k=1}^{K} \lambda_k F_k(S, T)\right)$$

as described in Och, F., Ney, H., *Discriminative Training And Maximum Entropy Models For Statistical Machine Translation*, Proc. Annual Meeting of the Association for Computational Linguistics, July 2002, Pittsburgh Pa., pp. 295-302, the contents of which are incorporated herein by reference. The interpolation parameters are chosen by maximizing the above probability using a gradient-based method, which can be done in a variety of ways.

The PWS transformation models trained during the training phase may then be used in the application phase. A dictated audio file is processed by the speech recognizer to create an (approximate) verbatim transcription S, i.e., unstructured speech recognition text. The PWS transformation models are used to find the most likely target sequence T. Posterior probabilities are computed for the allowable replacements in each source sequence position $p(\tau_i|S)$. To that end, a dynamic programming beam search is performed over the potential sequences of allowable replacements creating a graph of most likely transformations. Then, a forward-backward algorithm is used to compute edge posterior probabilities, and values are accumulated for edges corresponding to the same source position and replacement. Next, the target sequence is derived by choosing the replacement with the maximal probability $p(\tau_i|S)$ for each source word. This procedure minimizes the probability of choosing the wrong replacement for a given source position. The target sequence is formatted to yield a written text document.

Embodiments can also be applied to an n-best list or lattice generated by a speech recognizer. In that case, the input to the PWS transformation models is not a single word sequence, but a plurality of hypotheses with associated scores. The model may include three additional feature functions, namely the acoustic, language model and confidence scores provided by the speech recognizer. Such embodiments are robust against recognition errors because the PWS transformation model can choose a different source sequence if it leads to a more plausible document.

The PWS transformation models can be speaker dependent models trained specifically for each user, or as speaker independent models from pooled data from a group of users, or a combination of speaker independent and speaker dependent feature functions. In some embodiments, the optimization of the $\lambda_k$ parameters can be regularized by applying a Gaussian or exponential prior.

Embodiments of the invention may be implemented in any conventional computer programming language. For example, preferred embodiments may be implemented in a procedural programming language (e.g., "C") or an object oriented programming language (e.g., "C++", "Python"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of transforming an input sequence of unstructured speech recognition text into output structured document text, the method comprising:
    performing transformation modeling of a source unstructured speech recognition text to create a most likely word sequence output structured document text, the transformation modeling including:
        providing a probabilistic word substitution model to establish association probabilities indicative of target structured document text correlating with source unstructured speech recognition text;
        considering a set of candidate sequences of structured document text based on the word substitution model with respect to an input sequence of unstructured speech recognition text;
        evaluating the likelihood of candidates corresponding to the input sequence of unstructured speech recognition text;
        determining as an output a most likely sequence of structured document text.

2. A method according to claim 1, wherein the most likely sequence of structured document text is derived using a dynamic programming beam search.

3. A method according to claim 1, wherein the most likely sequence of structured document text is derived from local posterior probabilities determined using a forward-backward algorithm.

4. A method according to claim 1, wherein the word substitution model derives probabilities by a log-linear combination of one or more feature functions.

5. A method according to claim 4, wherein the word substitution model includes interpolation parameters.

6. A method according to claim 4, wherein the feature functions are defined in terms of associations between a source word and a sequence of target words.

7. A method according to claim 1, where the probabilistic word substitution model is derived based on a set of archived dictations and corresponding text documents.

8. A method according to claim 1, wherein the word substitution model uses speaker dependent models.

9. A method according to claim 1, wherein the word substitution model uses speaker independent models.

10. A method according to claim 1, wherein the word substitution model uses a combination of speaker dependent models and speaker independent models.

11. A method according to claim 1, wherein the structured document text includes medical report document text.

12. A method according to claim 1, wherein the structured document text includes legal document text.

13. A computer program product in a non-transitory computer readable storage medium for transforming an input sequence of unstructured speech recognition text into output structured document text, the product comprising:
    program code for performing transformation modeling of a source unstructured speech recognition text to create a most likely word sequence output structured document text, the program code for performing transformation modeling including:
        program code for providing a probabilistic word substitution model to establish association probabilities indicative of target structured document text correlating with source unstructured speech recognition text;
        program code for considering a set of candidate sequences of structured document text based on the word substitution model with respect to an input sequence of unstructured speech recognition text;
        program code for evaluating the likelihood of candidates corresponding to the input sequence of unstructured speech recognition text;
        program code for determining as an output a most likely sequence of structured document text.

14. A computer program product according to claim 13, wherein the most likely sequence of structured document text is derived using a dynamic programming beam search.

15. A computer program product according to claim 13, wherein the most likely sequence of structured document text is derived from local posterior probabilities determined using a forward-backward search.

16. A computer program product according to claim 13, wherein the word substitution model derives probabilities by a log-linear combination of one or more feature functions.

17. A computer program product according to claim 16, wherein the word substitution model includes interpolation parameters.

18. A computer program product according to claim 16, wherein the feature functions are defined in terms of associations between a source word and a sequence of target words.

19. A computer program product according to claim 13, where the probabilistic word substitution model is derived based on a set of archived dictations and corresponding text documents.

20. A computer program product according to claim 13, wherein the word substitution model uses speaker dependent models.

21. A computer program product according to claim 13, wherein the word substitution model uses speaker independent models.

22. A computer program product according to claim 13, wherein the word substitution model uses a combination of speaker dependent models and speaker independent models.

23. A computer program product according to claim 13, wherein the structured document text includes medical report document text.

24. A computer program product according to claim 13, wherein the structured document text includes legal document text.

* * * * *